Figure 1:
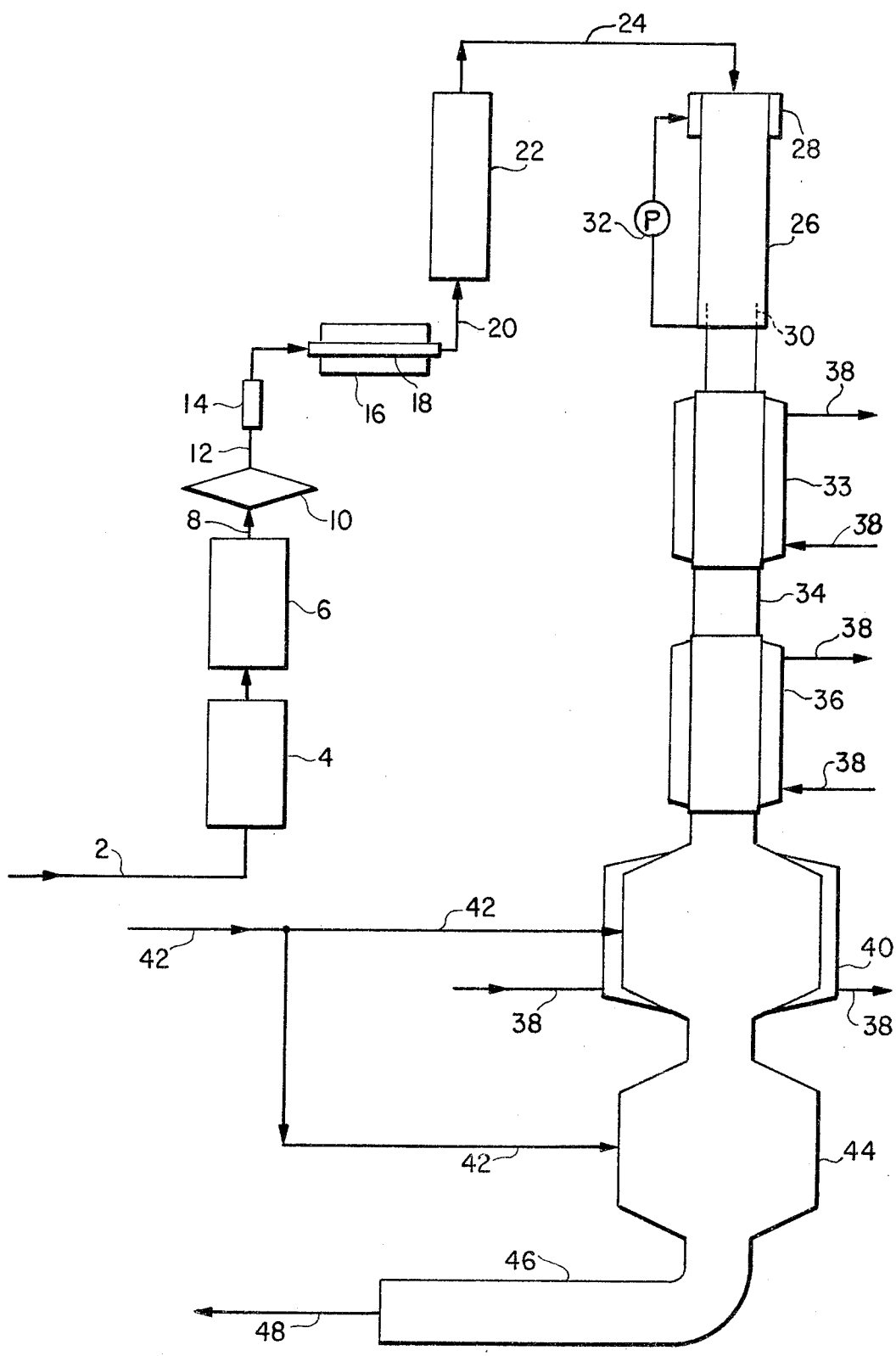
Figure 2:
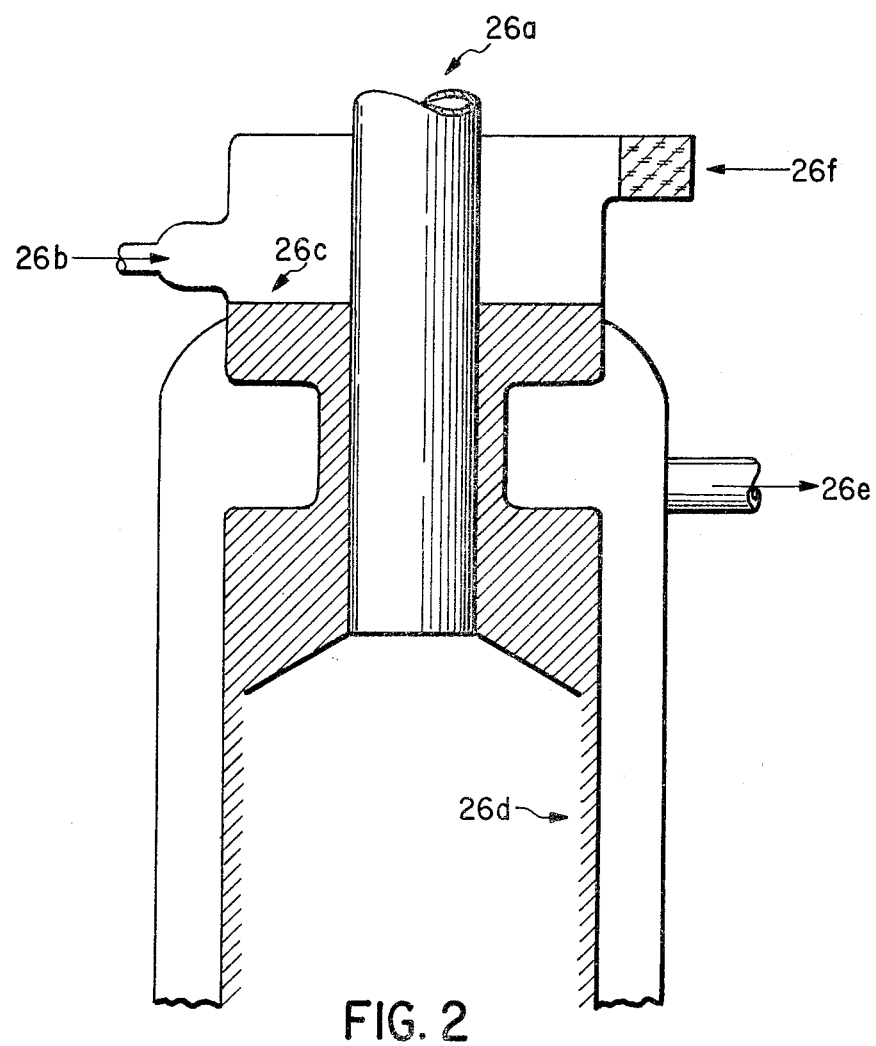

United States Patent [19]

Matijevic et al.

[11] 4,241,042

[45] Dec. 23, 1980

[54] SPHERICAL TITANIUM DIOXIDE PARTICLES AND PROCESS OF MANUFACTURE

[75] Inventors: Egon Matijevic, Potsdam, N.Y.; Mario Visca, Alessandria, Italy

[73] Assignee: Montedison S.p.A., Milan, Italy

[21] Appl. No.: 916,883

[22] Filed: Jun. 19, 1978

[51] Int. Cl.³ .......................................... C01G 23/047
[52] U.S. Cl. .................................. 423/610; 423/612; 423/613; 252/305
[58] Field of Search ............... 423/592, 610, 611, 612, 423/613; 106/300; 252/305

[56] References Cited

U.S. PATENT DOCUMENTS

| | | | |
|---|---|---|---|
| 1,819,184 | 8/1931 | MacIntire | 252/305 |
| 1,842,620 | 1/1932 | McInerny et al. | 423/613 |
| 1,931,380 | 10/1933 | Haber | 423/613 |
| 2,998,391 | 8/1961 | Jones et al. | 252/305 |
| 3,062,621 | 11/1962 | Nelson | 423/613 |
| 3,403,001 | 9/1968 | Mas et al. | 423/613 |
| 3,406,012 | 10/1968 | Rahn | 423/613 |
| 3,663,283 | 5/1972 | Hebert et al. | 423/613 |
| 3,914,396 | 10/1975 | Bedetti et al. | 423/613 |

FOREIGN PATENT DOCUMENTS

743508  1/1956  United Kingdom.

OTHER PUBLICATIONS

Espenscheid et al., "Logarithmic Distribution Functions for Colloidal Particles", *Journal of Physical Chemistry*, 68, (1964), pp. 3093-3097.
Matijevic et al., "Preparation and Mechanism of Formation of Titanium Dioxide Hydrosols of Narrow Size Distribution", *Journal of Colloid and Interface Science*, vol. 61, No. 2, Sep. 1977, pp. 302-311.
McRae et al., "Chemical Reactions in Aerosols", *Journal of Colloid and Interface Science*, vol. 53, No. 3, pp. 411-421.

*Primary Examiner*—Brian E. Hearn
*Attorney, Agent, or Firm*—Morgan, Finnegan, Pine, Foley & Lee

[57] ABSTRACT

Titanium dioxide, in the form of discrete, solid substantially spherical particles of a substantially uniform shape and size, is obtained by providing an aerosol comprising discrete liquid particles of a hydrolyzable titanium compound, contacting the aerosol with water vapor in dynamic flow to hydrolyze the liquid titanium (IV) compound to titanium dioxide, and recovering the desired product.

15 Claims, 8 Drawing Figures

SPHERICAL TITANIUM DIOXIDE PARTICLES AND PROCESS OF MANUFACTURE

FIELD OF THE INVENTION

This invention relates to a process for the preparation of titanium dioxide and to the resulting product. More particularly, the process is based on the controlled hydrolysis of a liquid aerosol comprising a volatile liquid titanium (IV) compound. The process results in the formation of titanium dioxide in the form of substantially non-aggregated solid particles having a uniform spherical shape, and in a narrow size distribution.

BACKGROUND OF THE INVENTION

Titanium dioxide has a wide variety of uses, e.g., as a pigment, a catalyst or a photoconductor, as well as other uses. Processes for the preparation of titanium dioxide are known in the art. In one such process, the ore ilmenite, containing titanium and iron, is treated with sulfuric acid, and the resulting solution is thermally hydrolyzed and then calcined in the presence of salts and/or orienting nuclei. Another such process is based on the chlorination of mineral rutile and/or enriched titanium-containing ores, to form titanium tetrachloride, followed by the purification of the titanium tetrachloride and its oxidation in the presence of other chlorides, especially $AlCl_3$.

The titanium dioxide provided by such processes typically is in the form of irregularly shaped prismatic or spheroidal particles, also having, in general, a broad size distribution. As is known, a broad granulometric distribution of titanium dioxide particles detracts from the usefulness of this material in many commercial applications. For instance, the color purity and optical performance of titanium dioxide pigments, either alone or in admixture with other pigments, may be adversely affected. Moreover, the titanium dioxide particles from these processes are often aggregated, and as a rule long and expensive procedures for breaking down the aggregates into smaller, individual particles are required.

On the other hand, it is known that the hydrolysis of an aqueous solution of titanium tetrachloride, leads to the formation of titanium dioxide as needle-shaped particles having a predominantly rutile crystal structure.

E. Matijevic et al, in the Journal of Colloid and Interface Science, Vol. 61, page 302 (1977), describe the preparation of non-aggregated spherical particles of titanium dioxide, in a narrow size distribution, by the hydrolysis of a solution of titanium tetrachloride at elevated temperatures, in the presence of sulfuric acid (sulfate ions). The method is not entirely satisfactory, however, because very long processing times are required, yields are low and very small particles, e.g., about 0.2 $\mu$m or less, which are useful in pigment manufacture, are not obtained. Moreover, not all of the titanium dioxide particles appear as regular spheres.

It is desirable that titanium dioxide particles have the following characteristics:
(i) a narrow size distribution;
(ii) the substantial absence of aggregation; and
(iii) a substantially uniform spherical shape.

These characteristics permit the application of rigorous light scattering principles to the optical behaviour of the particles, and, thus, to determine in advance the optimum diameter of the titanium dioxide for its various uses.

OBJECTS OF THE INVENTION

It is an object of this invention to provide titanium dioxide in discrete particulate form, in a narrow particle size distribution, the particles also having a substantially uniform spherical shape.

It is another object of this invention to provide a process for the formation of spherical particles of titanium dioxide which permits a wide selection of particle diameters, the desired diameter being obtained within a narrow size distribution range.

These objects are realized by the invention herein described.

DESCRIPTION OF THE INVENTION

In its broadest aspects, this invention provides a method of preparing titanium dioxide, comprising:

(A) providing a liquid aerosol comprising discrete liquid particles of a hydrolyzable titanium (IV) compound;

(B) contacting the liquid aerosol with water vapor in dynamic flow, to hydrolyze the liquid titanium (IV) compound to titanium dioxide in the form of discrete, solid substantially spherical particles of a substantially uniform shape and size; and (C) recovering the titanium dioxide.

The titanium dioxide of this invention is recovered in the form of substantially uniform spherical particles, substantially non-aggregated, having an average (modal) diameter in the range of from about 0.05 to about 3 $\mu$m. The process permits the formation of titanium dioxide particles of the desired average (modal) diameter in a very narrow size distribution. For instance, the width of particle size distribution, $\sigma o$, may be as low as 0.1$\sigma o$ is the measure of width of the size distribution as defined in the paper by W. F. Espenscheid et al J. Phys. Chem., Vol. 68, page 3093 (1964). In general, lower values of $\sigma o$ are indicative of greater uniformity of particle size.

In addition, the titanium dioxide particles of this invention can be prepared with different degrees of hydration. When anhydrous, the particles are extremely pure, i.e., containing in excess of 99.8% by weight of titanium dioxide. The resulting particles are readily dispersible in water without lossess in the uniformity of shape and size.

The titanium compounds used as starting materials in the process of this invention can be selected from a wide variety of hydrolyzable, volatile, liquid titanium compounds, preferably having a vapor pressure of about 1 torr (1 torr = 1 mm Hg) below about 200° C. By way of illustration, these include titanium tetrachloride, and titanium (IV) alkoxides, preferably of from 1 to 6 carbon atoms, e.g., titanium isopropoxide, titanium ethoxide, titanium pentoxide, or the like. The titanium tetrachloride can be obtained conventionally by the chlorination of a titanium-bearing ore, followed in the normal manner by purification and distillation. In practice, it is possible to employ titanium tetrachloride derived from the preparation of titanium dioxide by the well-known chlorination process, referred to above.

The aerosol, comprising liquid droplets of the hydrolyzable titanium compound suspended in a carrier gas, is prepared using known procedures, e.g., nebulization. Preferably, in order to provide an aerosol having droplets of a very narrow size distribution, and a smaller modal size, a falling liquid film aerosol generator is used. In general, in such a device, the liquid component is evaporated in an enclosed chamber, mixed with a flowing carrier gas and subsequently condensed in the carrier gas at a lower temperature. If desired, the condensation can be carried out in the presence of heterogenous nuclei, which usually results in a more narrow particle size distribution.

A preferred procedure for the preparation of the liquid aerosol comprises the following steps:
(a) nucleation,
(b) evaporation,
(c) condensation,
(d) reheating, and
(e) recondensation.

The term "nucleation" is used herein in the conventional sense to refer to the formation of a new phase from a homogeneous environment, such as a solid phase from a vapor phase or liquid phase from a vapor phase, under conditions of supersaturation. Nucleation may be controlled to occur homogeneously or heterogeneously. Homogeneous nucleation takes place when the new phase is self-induced, i.e., spontaneous at the critical degree of supersaturation. Heterogeneous nucleation takes place when the formation of the new phase is induced by the presence of a foreign material, e.g., solid particles.

By way of illustration, in homogeneous nucleation the hydrolyzable titanium compound, previously vaporized, is condensed, by cooling, into discrete liquid particles, in a flowing carrier gas. The carrier gas is preferably an inert material, such as nitrogen, helium, air, preferably dried air, or any of the other gases conventionally employed as carriers for solid or liquid aerosols. The procedure is carried out under conditions of relatively high supersaturation, i.e., the vaporized titanium compound is present in amounts of 200–300% over saturation.

When heterogeneous nucleation is applied, solid nuclei which can be produced from a wide variety of materials, such as ionic, metallic and the like, are introduced into a flowing carrier gas, such as any of the above. The nature of the solid is not critical, and virtually any solid material can be used. The solid nuclei are generated by first directing the carrier gas over the solid, which has been heated to a temperature at least sufficient to cause its sublimation or vaporization (which can vary widely with the material, as is illustrated in detail herein). The vaporized solid is then cooled to below its vaporization or liquefaction temperature and thus condensed into discrete solid particles, e.g. in the range of from 10 to 100 Å in diameter, in the flowing carrier gas. These solid particles act as condensation sites (nuclei) for the hydrolyzable titanium compound, which has been previously vaporized, and which is now admixed with the solid nuclei in the carrier gas. In comparison with homogeneous nucleation, a smaller degree of supersaturation, e.g., 5% over saturation, is sufficient for the vapors of the titanium compound to condense.

The technique of nucleation, both homogeneous and heterogeneous, is well known in the art, and is illustrated in greater detail below.

In comparison with heterogeneous nucleation, homogeneous nucleation is more sensitive to temperature and pressure gradients in a flow system, which results in concentration gradients. Moreover, homogeneous nucleation is more easily affected by contaminants and irregularities in container surfaces. As a consequence, it is more difficult to control the particle size in a homogeneously nucleated system. Therefore, heterogeneous nucleation is preferred in carrying out the process of this invention.

BRIEF DESCRIPTION OF THE DRAWINGS

FIG. 1 is a schematic drawing of a preferred process according to this invention.

FIG. 2 illustrates a preferred modification for the falling liquid film aerosol generator shown in FIG. 1.

FIG. 3 represents a scanning electron micrograph (SEM) of spherical titanium dioxide particles according to this invention, obtained by the controlled hydrolysis of a titanium (IV) ethoxide liquid aerosol. The magnification is 5000×.

FIG. 4 represents a scanning electron micrograph of the same sample as in FIG. 3 taken at a magnification of 1000×.

FIG. 5 represents a transmission electron micrograph of spherical titanium dioxide particles according to this invention, obtained by the conrolled hydrolysis of a titanium (IV) ethoxide liquid aerosol. The magnification is 20000×.

FIG. 6 represents a scanning electron micrograph of spherical titanium dioxide particles according to this invention, obtained by the controlled hydrolysis of a titanium (IV) isopropoxide liquid aerosol. The magnification is 5000×.

FIG. 7 is a graph showing the effect of the carrier gas flow rate and the nuclei generator temperature on the particle size, in a heterogeneously nucleated system.

FIG. 8 is a graph showing the effect of the boiling temperature, for the liquid from which the liquid aerosol is made, on the particle size of the condensed liquid particles.

DETAILED DESCRIPTION OF THE SPECIFIC EMBODIMENTS

With reference to FIG. 1, inert gas stream 2, passes through drying columns 4 and 6, which are packed with a suitable drying agent, e.g., magnesium perchlorate, phosphorus pentoxide, or the like. Dried inert gas stream 8, is filtered through a suitable filter 10. Filtered inert gas stream 12, is introduced, at a flow rate controlled by flowmeter 14, into solid nuclei generator 16, at a uniform flow rate.

Nuclei generator 16, contains sillimanite tube 18, in which is centered a "Vicor" glass boat containing a solid nucleating material, e.g., silver chloride. The temperature of nuclei generator 16, is adjusted to give a suitable vapor pressure for the solid nucleating material formation. This varies depending on the material used to form the solid nuclei. By way of illustration, in preparing octanoic acid aerosols, using AgCl as the nucleating material, a temperature of between 404° and 645° C. in the nuclei generator is preferred. In the case of linolenic acid aerosols, prepared using AgCl or NaCl as the nucleating material, nuclei generator temperatures of 500°, 642° or 718° C. are preferred. In the case of dibutylphthalate aerosols, using NaCl as the nucleating material, nuclei generator temperatures of 590°, 645° and 690° C. are employed. In the case of NaCl aerosols, using NaF as the nucleating material, a temperature of 850° C. is preferred. Suitable temperatures for other materials are readily determinable with only a small amount of work, or can be obtained by reference to the literature.

Inert gas stream 12 passes through sillimanite tube 18, and admixes with the vaporized solid nucleating material. By way of illustration, in the case of titanium (IV) alkoxides, the inert gas flow rate is maintained between 150 and 1,500 ml/min., and for titanium tetrachloride between 40 and 3,000 ml/min, but other flow rates can be used as long as the Reynolds number is less than 2,000. Upon emerging from nuclei generator 16, the vaporized nucleating material cools and condenses, to provide stream 20, which comprises particles of solid nuclei suspended in the inert gas. Stream 20 is then thermally equilibrated in coil condenser 22, to the temperature of the liquid aerosol generator.

Preheated stream 24, comprising the inert gas and solid condensation nuclei, passes through falling liquid film aerosol generator 26, which comprises an enclosed tubular chamber, the inside walls of which are covered with a thin, continuous flowing film of a volatile liquid hydrolyzable titanium compound. The liquid film flows from upper reservoir 28, to lower reservoir 30, from which it is recirculated by means of a peristaltic pump 32 to upper reservoir 28. The entire assembly is maintained at temperatures which give a sufficient vapor pressure of the hydrolyzable liquid titanium compound but below the vaporization temperature of the solid nuclei.

Preferably, the temperature of the falling liquid film generator is such as to give a vapor pressure within the vessel of from about 0.1 to about 100 torr. Illustratively, when using titanium (IV) ethoxide as the hydrolyzable compound, a temperature of between 75° and 99° C. is maintained in the falling liquid film generator; in the case of titanium (IV) isopropoxide, a temperature of between 30° and 60° C.; in the case of titanium tetrachloride, a temperature of between 0° and 40° C. Because of the inherently high vapor pressure of $TiCl_4$, the amount of vapor produced in the inert carrier gas is considerably more than in the case of titanium (IV) alkoxides.

In general, the gas flow rate through falling liquid film aerosol generator 26, is maintained in the laminar region, e.g., corresponding to a Reynolds number less than or equal to 2,000. The linear velocity of the falling liquid film should be nearly equal to the linear velocity of the flowing gas.

A preferred falling liquid film generator is described in the Journal of Colloid and Interface Science, Vol. 34, page 534, FIG. 1 (1970), incorporated herein by reference. The falling liquid film generator is preferably modified to contain a head unit of the design shown in FIG. 2, comprising carrier gas inlet 26(*a*), inlet for liquid (from the peristaltic pump) 26(*b*), liquid head 26(*c*), falling liquid film 26(*d*), outlet to constant temperature bath 26(*e*) and stopper 26(*f*).

With reference again to FIG. 1, the inert gas stream, comprising the condensed solid nuclei and the vapor of the hydrolyzable titanium compound, passes from falling film generator 26, into first condenser 33, at a controlled temperature, where the vapor of the hydrolyzable titanium compound is cooled to below its liquefaction temperature, and thus condenses upon the solid nuclei in the form of liquid droplets of uniform size. Illustratively, the condenser is maintained at a temperature of 25° C. for titanium (IV) alkoxides, and at between −6° C. and −30° C. for titanium tetrachloride.

To enhance the uniformity of particle size, the resulting liquid aerosol stream passes from first condenser 33, into heating tube 34, where a second evaporation of the hydrolyzable titanium compound takes place (the first evaporation having taken place in the falling liquid film generator). Heating tube 34 is maintained at a temperature at least sufficient to allow complete evaporation of the liquid aerosol. In general, temperatures corresponding to those employed for the vaporization of the hydrolyzable compound in the aerosol generator, are suitable. The evaporated liquid aerosol is thereafter recondensed, in second condenser 36, by means of a cooling line 38.

The evaporation and condensation steps may be repeated again, as desired. At the end of the second condensation step, or after the desired number of evaporation and condensation steps, the liquid aerosol of the hydrolyzable titanium compound is ready for hydrolysis and conversion to spherical titanium dioxide.

To obtain the spherical titanium dioxide particles from the liquid droplets of the hydrolyzable titanium compound, the latter must be brought into contact with water, and preferably water vapor. The hydrolysis reaction can be carried out in one or more stages. The contact between the liquid droplets of the hydrolyzable titanium compound and the water vapor, is achieved by various methods, e.g., by bubbling the liquid aerosol through water, by directing the liquid aerosol over a water surface, or by injecting an inert gas stream saturated with water vapor into the aerosol stream. Preferably, a gas stream saturated with water vapor is injected into the liquid aerosol stream.

With reference again to FIG. 1, the preferred hydrolysis procedure is carried out in three stages. In the first stage, stream 42, comprising an inert gas, e.g., helium, nitrogen, air or the like, which has been saturated with water vapor, is injected into first hydrolysis manifold chamber 40, through which the liquid aerosol is permitted to flow. A suitable manifold chamber is described by McRae et al in the Journal of Colloid and Interface Science, Vol. 53, page 411 (1975), incorporated herein by reference. The water vapor amount in the carrier gas should be in excess of the stoichiometric amount needed to completely hydrolyze the titanium compound. In order to avoid too fast an evaporation of the liquid droplets in the aerosol, first hydrolysis manifold chamber 40, is preferably maintained at the temperature of the condensation of the liquid aerosol.

In the second stage, the partially hydrolyzed liquid aerosol from first manifold chamber 40, passes into second hydrolysis manifold chamber 44, maintained at room temperature, where it admixes with a second stream of water-saturated inert gas stream 42.

In the third stage, the stream emerging from second manifold chamber 44, comprising the partially hydrolyzed aerosol, excess water vapor from the first two stages and reaction products, e.g., HCl, alcohol, and the like, is heated to a temperature of from about 100° C. to about 250° C. in elongated chamber 46. This completes the hydrolysis.

During the hydrolysis, the liquid droplets of the titanium compound react with the water vapor to produce solid spherical titanium dioxide and/or hydroxide particles of substantially uniform size. The by-products of the hydrolysis will depend on the nature of the particular hydrolyzable titanium compound employed. For instance, in the case of titanium tetrachloride as the starting material, hydrogen chloride is released upon hydrolysis. In the case of titanium alkoxides as the starting material, the corresponding alcohols will be released, e.g., ethanol vapor from titanium ethoxide. The resulting solid particles of titanium dioxide are extremely pure.

After the hydrolysis, aerosol stream 48, comprising solid, spherical titanium dioxide particles and reaction products suspended in the carrier gas, is treated to separate the titanium dioxide particles. Conventional procedures for the separation of solids from solid/gas aerosols can be used, such as filtration, electrostatic precipitation, thermal gradient deposition by means of a thermopositor, or cyclone centrifugation.

When titanium alkoxides are used as the starting material, the solid aerosol particles are preferably collected in a thermopositor. Titanium dioxide particles generated from titanium tetrachloride, on the other hand, are preferably collected or a Millipore filter, e.g., about 0.22 microns pore size, so as to avoid corrosion of the thermopositor by the by-product HCl.

Typical titanium dioxide spherical particles are shown in FIGS. 3 to 6. These are of a substantially uniform shape and size.

If desired, the crystalline structure and the water content of the titanium dioxide particles can be altered, by subjecing the spherical particles to a thermal treatment at temperatures in the range of from about 250° to about 1,100° C. This thermal treatment can be carried out before the titanium dioxide recovery step (by heating the solid aerosol stream), or after the titanium dioxide recovery step. The former procedure is preferred, and it can be performed by direct, or indirect, heating. By means of this procedure, as higher temperatures are employed, the water content in the spherical titanium dioxide particles is decreased, and the rutile crystalline content is increased (from anatase to rutile).

The titanium dioxide particles can be treated to obtain a surface static charge, either positive or negative as desired, by forming a suspension of the particles in water and regulating the pH. The particles of this invention normally possess an electrokinetic point of zero charge at a pH in the range of from 4.0 to 5.5. Below this pH range, the titanium dioxide particles are positively charged, and above this pH range, the titanium dioxide particles are negatively charged.

EFFECT OF CARRIER GAS FLOW RATE AND NUCLEI GENERATOR TEMPERATURE ON PARTICLE SIZE

Figure 7:
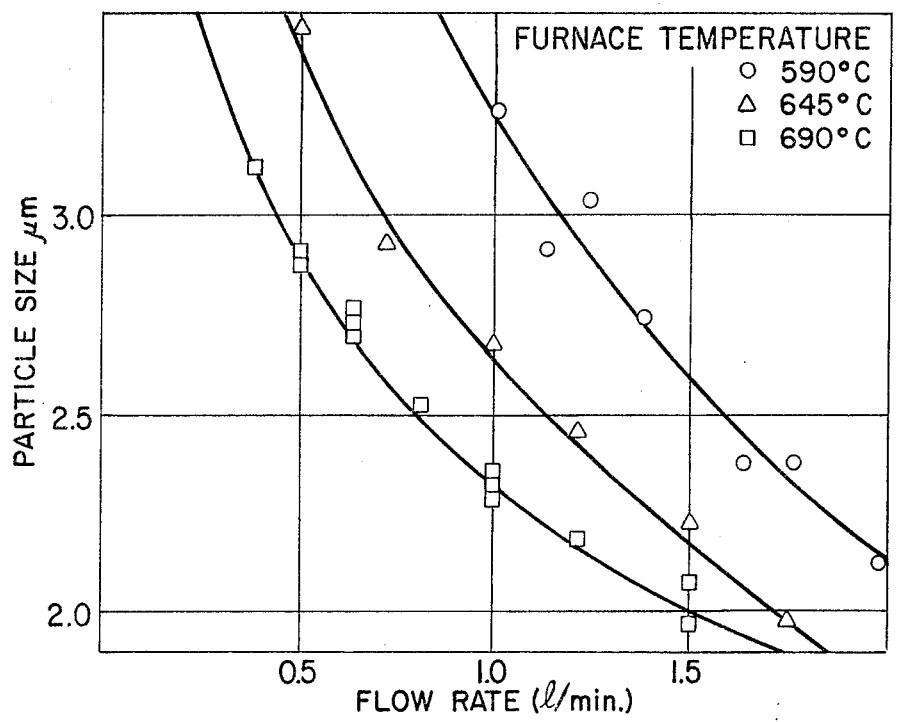

In general, an increase in the flow rate of the carrier gas for the aerosol results in smaller modal particle diameters. This effect is shown in FIG. 7, for a dibutylphthalate liquid aerosol formed using heterogeneous nucleation, with NaCl as the material for the solid nuclei, and nuclei generator temperatures set at 590°, 645° and 690° C., respectively. As is shown, for a given constant temperature, as the carrier gas flow rate is increased, there is a corresponding decrease in the modal particle diameter of the condensed liquid particles. Which ultimately results in the recovery of smaller particles of titanium dioxide, after hydrolysis.

Similarly, an increase in the temperature of the nuclei generator results in smaller modal diameters for the liquid particles condensed on the solid nuclei, as shown in FIG. 7. For instance, at a constant flow rate, as the temperature is increased the modal particle diameter correspondingly decreases in all cases.

EFFECT OF FALLING LIQUID FILM AEROSOL GENERATOR TEMPERATURE ON PARTICLE SIZE

Figure 8:
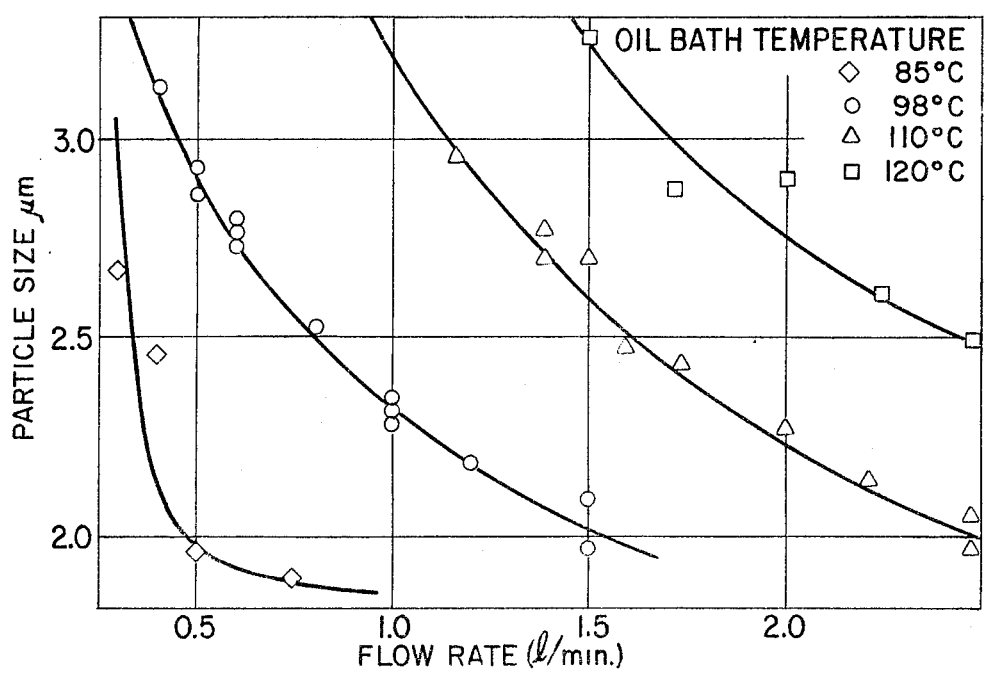

In general, an increase in the temperature in the falling liquid film aerosol generator, results in larger modal droplet sizes upon condensation of the vaporized liquid. This is illustrated in FIG. 8 for a dibutylphthalate (DBP) liquid aerosol, using NaCl solid nuclei and a nuclei generator temperature of 590° C. Analogous behavior was observed with liquid titanium compounds in the falling liquid film aerosol generator.

EFFECT OF NUCLEI CONCENTRATION ON PARTICLE SIZE

In general, the larger the number of nuclei introduced into a vapor of the hydrolyzable titanium compound, the smaller the liquid particles produced upon condensation, under otherwise identical conditions.

EXAMPLES

The following examples, which are not intended to be limiting, illustrate this invention.

EXAMPLE 1

Helium, which has been pre-dried over magnesium perchlorate and phosphorus pentoxide and filtered through a Millipore filter having a pore size of 0.22 microns, is introduced at a flow rate of 1,100 milliliters per minute (ml/min), into a nuclei generator. The nuclei generator comprises a tubular outer metal casing a sillimanite tube enclosed within the tubular casing, and a "Vicor" glass boat containing solid silver chloride (AgCl) as nucleating material. The temperature of the furnace is set at 620° C. The helium admixes with vaporized silver chloride, and upon emerging from the nuclei generator, condenses to yield solid nuclei of silver chloride dispersed in the flowing stream of helium gas.

The solid nuclei-laden gas is then preheated to 96.5° C. in a coil condenser, and passed through a falling liquid film aerosol generator at the same temperature, and a flow rate in the laminar region. The falling liquid film consists of titanium ethoxide, which is circulated by a peristaltic pump. The linear velocity of the falling liquid film is adjusted to approximately that of the gas flow rate. The titanium ethoxide is vaporized at the temperature of the aerosol generator, 96.5° C., and the titanium ethoxide vapors mix with the flowing stream of helium gas and suspended solid nuclei. A stream comprising helium gas, titanium ethoxide vapor and solid AgCl particles (nuclei), emerges from the falling liquid film generator. The stream is cooled in a condenser at 25° C. and the titanium ethoxide vapor undergoes a first condensation on the solid AgCl nuclei, to yield a liquid aerosol. The liquid aerosol is heated in a heating tube to complete evaporation of the liquid droplets, and then recondensed at 25° C. in a second condenser.

The resulting droplets of titanium ethoxide in the aerosol have a narrow size distribution, showing higher order Tyndall spectra (HOTS), as demonstrated when light is scattered to show various colors by the particle when viewed at different angles.

The titanium ethoxide is hydrolyzed as follows: nitrogen gas which has been saturated with water vapor, is admixed with the liquid aerosol by radial injection through a manifold at 25° C. in a first hydrolysis chamber. A partly hydrolyzed aerosol flows then into a second manifold hydrolysis chamber, where it is again admixed with a stream of nitrogen gas saturated with water vapor at room temperature. An excess of the water vapor, about twice that of the stoichiometric quantity necessary to completely react with the aerosol droplets, is used. To complete the hydrolysis and the conversion of the titanium ethoxide to titanium dioxide, the aerosol mixture is passed through a tube heated to a temperature of from 100° to 200° C. The resulting solid aerosol, comprising spherical particles of titanium dioxide suspended in helium gas, is recovered. The titanium dioxide particles have an average (modal) diameter of 0.17 μm, and a width of particle size distribution, σo, of 0.20.

In both the first and second hydrolysis chambers, the aerosol displays higher order Tyndall spectra (HOTS) indicating a uniform aerosol particle size. The recovered titanium dioxide, in the form of a powder, is readily dispersible in water by ultrasonication, and the resulting sol also displays higher order Tyndall spectra. Upon inspection by electron microscopy, the suspended particles are observed to be uniformly spherical, non-aggregated, and of a narrow size distribution.

EXAMPLE 2

The procedure of Example 1 is repeated, except that the temperature of the aerosol generator is 90.5° C. The recovered spherical particles of titanium dioxide have an average (modal) diameter of 0.12 μm, and a width of particle size distribution σo of 0.20.

EXAMPLE 3

Figure 3:
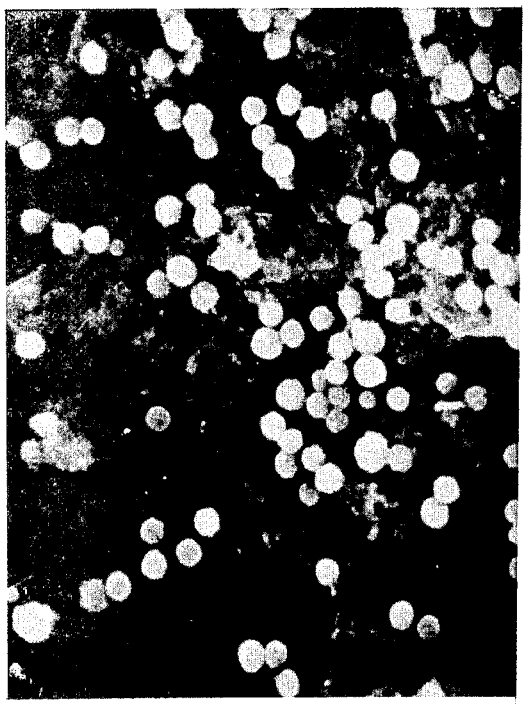
Figure 4:
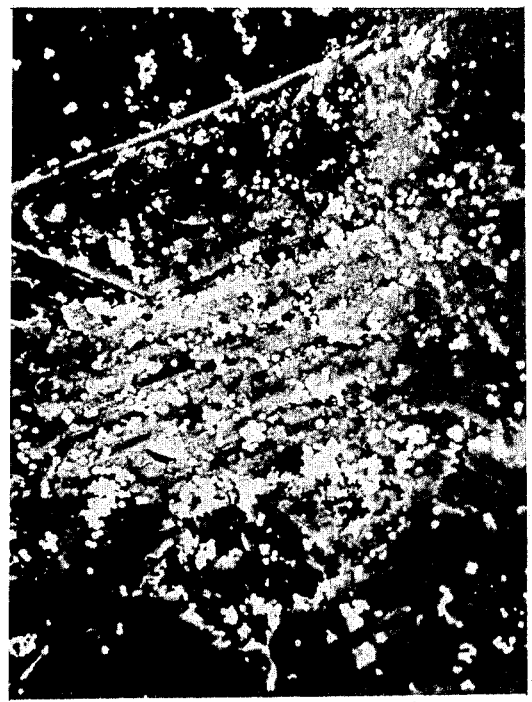

The procedure of Example 1 is repeated, except that a helium flow rate of 150 ml/min, is used. The resulting spherical titanium dioxide particles have an average (modal) diameter of 0.60 μm, and a width particle size distribution σo of 0.16. FIGS. 3 and 4 are scanning electron micrographs of such titanium dioxide particles which have been suspended in water and re-dried.

EXAMPLE 4

Figure 5:

The procedure of Example 1 is repeated except that a helium flow rate of 800 ml/min is used. The resulting spherical titanium dioxide particles have an average (modal) diameter of 0.22 μm, and the width particle size distribution σo of 0.14. FIG. 5 is a transmission electron micrograph of such titanium dioxide particles which have been suspended in water and re-dried.

EXAMPLE 5

Figure 6:
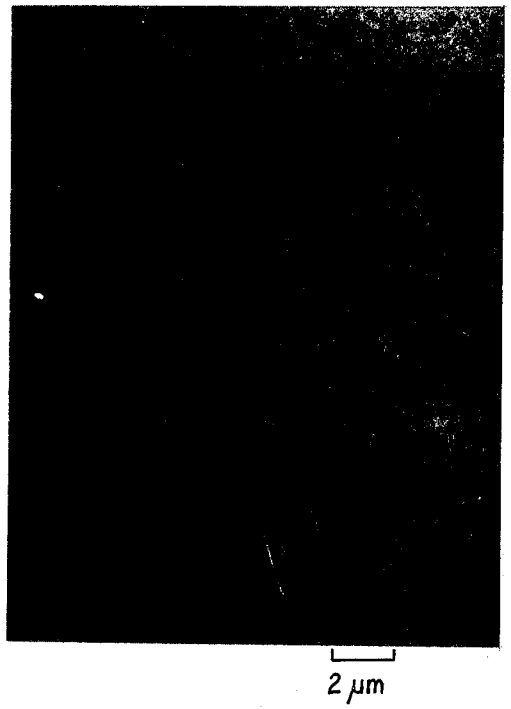

The procedure of Example 1 is repeated except that titanium (IV) isopropoxide was used with a helium flow rate of 500 ml/min and the temperature of the liquid falling film aerosol generator was maintained at 59° C. FIG. 6 is a scanning electron micrograph of such titanium dioxide particles which have been suspended in water and re-dried.

EXAMPLE 6

This example illustrates the preparation of titanium dioxide particles from titanium tetrachloride aerosols. The same equipment as in Example 1 is used.

A stream of nitrogen, which has been dehumidified over Drierite ®, or equivalent, and filtered through a Millipore filter having a pore size of 0.22 μm, is introduced at a flow rate of 100 ml/min into a nuclei generator containing solid silver chloride. The temperature of the generator is set at 620° C. The nitrogen stream admixes with vaporized silver chloride, and upon emerging from the nitrogen generator, condenses to yield solid AgCl nuclei dispersed in the flowing stream of nitrogen gas. The solid nuclei-laden gas is then passed through a falling liquid film aerosol generator, maintained at 25° C. by a thermostated bath. The falling liquid film consists of titanium tetrachloride, $TiCl_4$, which is circulated by a peristaltic pump. The titanium tetrachloride is evaporated at a rate of 880 mg/hr, and the vapor is condensed on the AgCl nuclei by cooling to −6° C. in a first condenser. The resulting liquid aerosol is then completely evaporated in a heated tube above the vaporization temperature of the titanium tetrachloride, and recondensed in a condenser at −6° C.

The titanium tetrachloride droplets are hydrolyzed in three stages. In the first stage, nitrogen gas saturated with water vapor is admixed with the liquid aerosol in a manifold chamber at −6° C. In the second stage, nitrogen gas which has been saturated with water vapor, is injected, in a second manifold chamber, into the partly hydrolyzed liquid aerosol of the first stage. A gas stream comprising the aerosol particles, hydrogen chloride (which is the product of the hydrolysis of titanium tetrachloride) and excess water vapor, is then conducted through a glass tube having a length of 40 centimeters, at a temperature of 200° C. Upon emerging from the heating glass tube, the solid aerosol particles of titanium dioxide are passed through a tubular furnace kept at about 900° C. The titanium dioxide is collected, in the form of a powder, on a Millipore filter having a pore size of 0.22 μm. The yield is about 40%.

A chemical analysis of the recovered powder indicates a purity of greater than 99.9%. The remainder consits of 0.02% Ag, and 0.07% Cl.

Upon inspection by electron microscopy, the titanium dioxide particles are observed to be perfectly spherical. The modal diameter of the particles is 1.2 μm, and the width of size distribution, σo, is 0.5. The titanium dioxide particles are readily dispersible in water by ultrasonication. The particles, after separation from water, are observed to be still perfectly spherical.

Other modifications and variations are possible in the light of the above description. It is to be understood, therefore, that changes may be made in the particular embodiments shown herein without departing from the scope of the invention, as defined in the appended claims.

We claim:

1. A method of preparing titanium dioxide, comprising:
   (A) providing a liquid aerosol comprising discrete liquid droplets of a hydrolyzable titanium (IV) compound;
   (B) contacting the liquid aerosol with water vapor in dynamic flow, to hydrolyze the liquid titanium (IV) compound to titanium dioxide in the form of discrete, solid, substantially spherical particles of a substantially uniform shape and size; and
   (C) recovering the titanium dioxide.

2. The method of claim 1 wherein the liquid aerosol is made by a process comprising:
   (a) cooling a vapor of the hydrolyzable titanium (IV) compound, in the presence of an inert gas, to a temperature at least sufficient to condense the vapor into discrete liquid droplets without condensing the inert gas;
   (b) evaporating the liquid droplets of the titanium (IV) compound from (a); and
   (c) re-condensing the vapor of the hydrolyzable titanium (IV) compound from (b) to liquid droplets of said compound in a narrower particle size distribution, to form the desired liquid aerosol.

3. The process of claim 2 wherein steps (b) and (c) are each repeated at least once.

4. The process of claim 2 wherein the hydrolyzable titanium (IV) compound and the inert gas are in dynamic flow.

5. The process of claim 2 wherein the vapor of the hydrolizable titanium (IV) compound is condensed in the presence of the inert gas using homogeneous nucleation.

6. The process of claim 2 hwerein the vapor of the hydrolyzable titanium (IV) compound is condensed in the presence of the inert gas using heterogeneous nucleation.

7. The process of claim 6 wherein the heterogeneous nucleation comprises condensing the vapor of the hydrolyzable titanium (IV) compound on solid condensation nuclei.

8. The method of claim 1 wherein the hydrolyzable titanium (IV) compound is selected from among liquid titanium (IV) alkoxides and titanium tetrachloride.

9. The method of claim 1 wherein the liquid aerosol contacting with water is effected by a process comprising:
(a) introducing a stream of an inert gas saturated with water vapor into a flowing stream of the liquid aerosol, at the temperature of condensation of the aerosol, to form a partial hydrolyzate of the titanium (IV) compound;
(b) introducing a second stream of an inert gas saturated with water vapor into a flowing stream of the partially hydrolyzed liquid aerosol from step (a); and
(c) heating the mixture from step (b) at a temperature at least sufficient to completely hydrolyze the titanium (IV) compound to titanium dioxide.

10. The process of claim 9 wherein the mixture comprising the water vapor-saturated inert gas and partially hydrolyzed liquid aerosol is heated at a temperature in the range between 100° and 250° C.

11. The method of claim 1 wherein the spherical particles of titanium dioxide are heated at a temperature in the range between 250° and 1,100° C.

12. The method of claim 11 wherein the spherical particles of titanium dioxide are heated at a temperature in the range between 250° and 1,100° C., before recovery.

13. The method of claim 11 wherein the spherical particles of titanium dioxide are heated at a temperature in the range between 150° and 1,100° C., after recovery.

14. The method of claim 1 wherein the titanium dioxide particles have an average (modal) diameter in the range of from about 0.05 to about 3 μm.

15. The method of claim 14 wherein the titanium dioxide particles have a width of particle size distribution, $\sigma_o$, as low as 0.1.

* * * * *

UNITED STATES PATENT AND TRADEMARK OFFICE
CERTIFICATE OF CORRECTION

PATENT NO. : 4,241,042
DATED : December 23, 1980
INVENTOR(S) : Egon Matijevic et al It is certified that error appears in the above-identified patent and that said Letters Patent are hereby corrected as shown below:

In Col. 12, line 21, "150°" should read -- 250° --.

Signed and Sealed this

Twelfth Day of May 1981

[SEAL]

Attest:

RENE D. TEGTMEYER

Attesting Officer     Acting Commissioner of Patents and Trademarks